(12) United States Patent
Kim et al.

(10) Patent No.: US 12,496,868 B2
(45) Date of Patent: Dec. 16, 2025

(54) COOLING APPARATUS AND VEHICLE INCLUDING THE SAME

(71) Applicants: HYUNDAI MOTOR COMPANY, Seoul (KR); KIA CORPORATION, Seoul (KR)

(72) Inventors: Tae Hee Kim, Ansan-si (KR); Wan Je Cho, Hwaseong-si (KR); Seong-Bin Jeong, Hwaseong-si (KR); Hyunjae Lee, Yongin-si (KR); Minseob Shin, Daejeon (KR); Yong Woong Cha, Yongin-si (KR); Jae-Eun Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 279 days.

(21) Appl. No.: 18/383,800

(22) Filed: Oct. 25, 2023

(65) Prior Publication Data

US 2025/0042221 A1 Feb. 6, 2025

(30) Foreign Application Priority Data

Aug. 2, 2023 (KR) ........................ 10-2023-0101086

(51) Int. Cl.
*B60H 1/00* (2006.01)

(52) U.S. Cl.
CPC ..... *B60H 1/00478* (2013.01); *B60H 1/00278* (2013.01); *B60H 2001/00307* (2013.01)

(58) Field of Classification Search
CPC ...... B60H 1/00478; B60H 2001/00135; B60H 1/00271; B60H 1/00278; B60H 2001/003;

(Continued)

(56) References Cited

U.S. PATENT DOCUMENTS

| 11,217,841 B2 * | 1/2022 | Lee | ........... H01M 10/617 |
| 2012/0125013 A1 * | 5/2012 | Akiyama | ............. F25B 21/02 |
| | | | 62/3.2 |
| 2020/0373638 A1 * | 11/2020 | Lee | ........... H01M 10/6572 |

FOREIGN PATENT DOCUMENTS

KR 20080037159 A * 4/2008 ............. H10N 10/00

OTHER PUBLICATIONS

KR-20080037159-A English Translation (Year: 2008).*

* cited by examiner

*Primary Examiner* — Frantz F Jules
*Assistant Examiner* — Devon Moore
(74) *Attorney, Agent, or Firm* — Lempia Summerfield Katz LLC

(57) ABSTRACT

A cooling apparatus may include an electric water pump to pump coolant, a coolant channel in fluid communication with a cooling target and the electric water pump, and a thermoelectric device including a higher-temperature part and a lower-temperature part. The thermoelectric device may cool the coolant flowing into the coolant channel. The cooling apparatus may include a first heat sink disposed adjacent to the higher-temperature part, a second heat sink disposed adjacent to the coolant channel, and a cooling fan provided adjacent to the first heat sink. The cooling apparatus may include an air duct forming a first fluid line where air passes through only the first heat sink and is then discharged by operation of the cooling fan and forming a second fluid line where air passes through the first heat sink and the second heat sink and is then discharged by the operation of the cooling fan.

14 Claims, 20 Drawing Sheets

(58) Field of Classification Search
CPC ...... B60H 2001/00307; B60H 1/00385; B60H 1/00392; B60H 1/004; B60H 1/00564; B60H 1/00664; B60H 1/00671; B60H 1/00835; H05K 7/20136; H05K 7/20145; F25B 21/00; F25B 21/02; F25B 21/04; F25B 2321/0251; F25B 2321/0252; F25B 2321/023; F24F 5/0042
See application file for complete search history.

COOLING APPARATUS AND VEHICLE INCLUDING THE SAME

CROSS-REFERENCE TO RELATED APPLICATION

This application claims priority to and the benefit of Korean Patent Application No. 10-2023-0101086 filed in the Korean Intellectual Property Office on Aug. 2, 2023, the entire contents of which are incorporated herein by reference.

BACKGROUND

(a) Technical Field

The present disclosure relates to a cooling apparatus and a vehicle including the same. More particularly, the present disclosure relates to a cooling apparatus and a vehicle including the same capable of cooling a cooling target using a thermoelectric device.

(b) Description of the Related Art

Generally, an air conditioning system for a vehicle includes an air conditioner unit circulating a refrigerant in order to heat or cool the vehicle interior.

The air conditioner unit, which is configured to maintain the vehicle interior at an appropriate temperature regardless of a change in an external temperature to maintain a comfortable interior environment, is configured to heat or cool the vehicle interior by heat-exchange. Specifically, the air conditioner unit is configured to heat or cool the vehicle interior by a condenser and an evaporator in a process in which a refrigerant discharged by driving of a compressor is circulated back to the compressor through the condenser, a receiver drier, an expansion valve, and the evaporator.

In accordance with an increase in interest in energy efficiency and a continuing environmental pollution problem, the development of an environmentally-friendly vehicle capable of substantially substituting for an internal combustion engine vehicle is required. Such an environmentally-friendly vehicle is classified into one of an electric vehicle driven using a fuel cell or electricity as a power source and a hybrid vehicle driven using an engine and a battery.

In an electric vehicle or a hybrid vehicle among these environmentally-friendly vehicles, unlike an air conditioner of a general vehicle, a separate heater is not used to heat or cool the vehicle interior. An air conditioner used in the environmentally-friendly vehicle is generally called a heat pump system.

The heat pump system performs the functions of cooling the vehicle interior, cooling the battery module, and cooling electric components such as an autonomous driving controller.

In order to supply coolant and/or refrigerant to the battery module and electric components disposed in various positions of a vehicle body, the length of coolant pipes and/or refrigerant pipes becomes long, which causes a problem in that the efficiency of the heat pump system is lowered.

The above information disclosed in this Background section is provided only to enhance understanding of the background of the disclosure. Thus, the Background section may contain information that does not form the prior art that is already known to a person of ordinary skill in the art.

SUMMARY

The present disclosure provides a cooling apparatus capable of independently cooling a cooling target such as an autonomous driving controller. The cooling apparatus may be provided separately from an existing heat pump system.

A cooling apparatus may include: an electric water pump configured to pump coolant, a coolant channel in fluid communication with a cooling target and the electric water pump, and a thermoelectric device including a higher-temperature part heated by being supplied with electrical energy and a lower-temperature part cooled by being supplied with electrical energy. The thermoelectric device may be configured to cool the coolant flowing into the coolant channel by the lower-temperature part. The apparatus may also include a first heat sink disposed adjacent to the higher-temperature part of the thermoelectric device, a second heat sink disposed adjacent to the coolant channel, and a cooling fan provided adjacent to the first heat sink. The apparatus may also include an air duct forming a first fluid line through which air passes via only the first heat sink and then is discharged by an operation of the cooling fan and may include a second fluid line through which air passes via the first heat sink and the second heat sink and then is discharged by the operation of the cooling fan.

A cooling apparatus may further include a reservoir tank configured to temporarily store coolant and replenish coolant to the coolant channel.

A cooling apparatus may further include a thermal insulation pad provided to surround a side surface of the thermoelectric device.

The cooling fan, the first heat sink, the coolant channel, and the second heat sink may be sequentially disposed along a predetermined direction.

The air duct may include a duct lower body disposed below the cooling fan and having a hollow interior, a duct side body extending upward from the duct lower body and having a hollow interior, and a duct upper body extending from a side surface of the duct side body and having a hollow interior. An air door may be provided on a side surface air outlet formed on the duct side body and an upper air outlet may be formed on an end portion of the duct upper body.

The upper air outlet may be formed to face the second heat sink.

The first air fluid line and the second air fluid line may be formed according to an operation of the air door.

The first air fluid line may include an opening of the duct lower body, an interior space of the duct lower body, an interior space of the duct side body, and the side surface air outlet formed on the duct side body.

The second air fluid line may include an opening of the duct lower body, an interior space of the duct lower body, an interior space of the duct side body, an interior space of the duct upper body, and the opening of the duct upper body.

When the air door rotates in a first direction, the side surface air outlet may be opened and an interior space of the duct side may be is blocked, such that the first air fluid line may be formed. When the air door rotates in a second direction, the side surface air outlet may be blocked and the interior space of the duct side body may be opened, such that the second air fluid line may be formed.

The cooling apparatus, according to a temperature of the cooling target, may be configured to operate in a first mode in which the coolant of the coolant channel is cooled by the lower-temperature part of the thermoelectric device and by air circulation of the air duct and to operate in a second mode in which the coolant of the coolant channel is cooled only by the air circulation of the air duct.

The cooling apparatus may be configured to operate in the first mode when the temperature of the cooling target is a predetermined temperature or above and to operate in the second mode when the temperature of the cooling target is below the predetermined temperature.

In the first mode, the thermoelectric device may be turned on such that the lower-temperature part of the thermoelectric device cools the coolant of the coolant channel. The coolant stored in the coolant channel may be cooled by cooling the first heat sink by air passing through the first air fluid line of the air duct by the operation of the cooling fan.

In the second mode, the thermoelectric device may be turned off and the coolant stored in the coolant channel may be cooled by cooling the second heat sink by air passing through the second air fluid line of the air duct by the operation of the cooling fan.

A vehicle may include the cooling apparatus described above.

According to a cooling apparatus of the present disclosure, the load of the existing heat pump system may be decreased by cooling a cooling target such as an autonomous driving controller through a separate cooling apparatus.

Other effects that may be obtained or are predicted according to an embodiment are explicitly or implicitly described in the detailed description of the present disclosure. In other words, various effects that are predicted according to the disclosed embodiments are described in the following detailed description.

BRIEF DESCRIPTION OF THE DRAWINGS

These drawings are for reference only in describing embodiments of the present disclosure. Therefore, the technical idea of the present disclosure should not be limited to the accompanying drawings.

Figure 1:
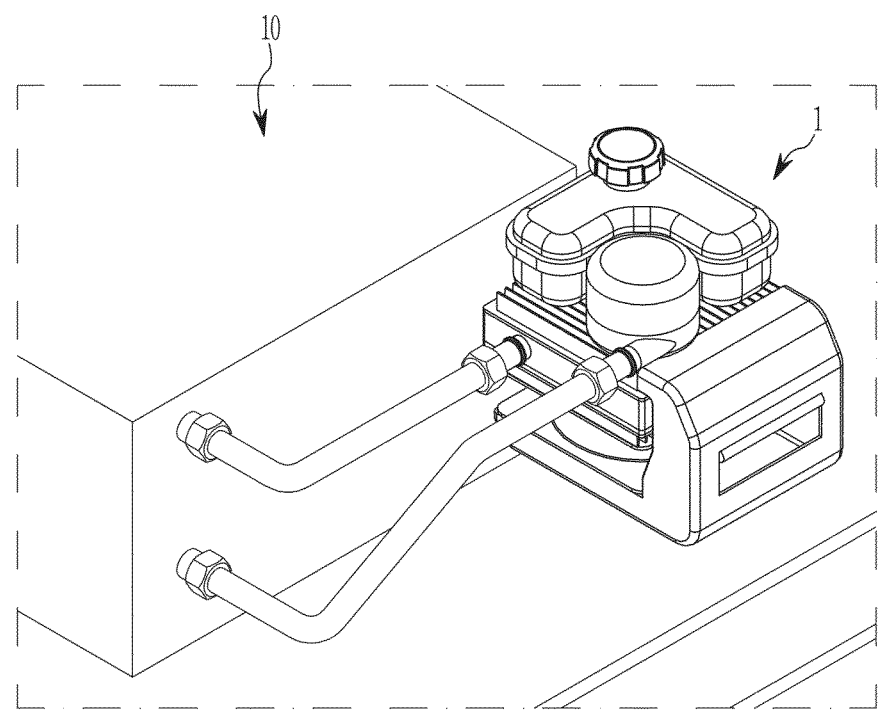
FIG. 1 is a perspective view showing a partial configuration of a vehicle to which a cooling apparatus according to an embodiment is mounted.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the present inventive concept. As used herein, the singular forms are intended to include the plural forms as well, unless the context clearly indicates otherwise. It should be further understood that the terms "comprise" and/or "comprising," "include" and/or "including", and "have" and/or "having", and variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

The present disclosure is described more fully hereinafter with reference to the accompanying drawings, in which embodiments of the disclosure are shown. As those of ordinary skill in the art should realize, the described embodiments may be modified in various different ways, all without departing from the spirit or scope of the present disclosure.

In order to clearly describe the present disclosure, parts that are irrelevant to the description have been omitted, and identical or similar constituent elements throughout the specification are denoted by the same reference numerals.

In addition, the size and thickness of each configuration shown in the drawings are arbitrarily shown for understanding and ease of description. The present disclosure is not limited thereto. Also, to clearly illustrate several portions and regions, thicknesses thereof are increased.

The terms "module" and "unit" used for components in the following description are used only in order to make the specification more dear. Therefore, these terms do not have meanings or roles that distinguish them from each other by themselves.

In describing embodiments of the present specification, where it has been determined that a detailed description of the well-known art associated with the present inventive concept may obscure the gist of the present inventive concept, a description of the well-known art has been omitted.

The accompanying drawings are provided only in order to enhance understanding of the embodiments disclosed in the present specification and are not to be interpreted as limiting the spirit and scope of the present inventive concept disclosed in the present specification. It should be understood that the embodiments of the present disclosure include all modifications, equivalents, and substitutions without departing from the scope and spirit of the present inventive concept.

Terms including ordinal numbers such as first, second, and the like are used only to describe various components and should not be interpreted as limiting these components.

In the description below, expressions described in the singular form may be construed in the singular or plural unless an explicit expression such as "one" or "single" is used.

The terms are used only to discriminate one constituent element from another constituent element. When a component, device, element, or the like of the present disclosure is described as having a purpose or performing an operation, function, or the like, the component, device, or element should be considered herein as being "configured to" meet that purpose or perform that operation or function.

Hereinafter, a cooling apparatus according to an embodiment of the present disclosure is described in detail with reference to the accompanying drawings.

FIG. 1 is a perspective view showing a partial configuration of a vehicle to which a cooling apparatus according to an embodiment is mounted.

As shown in FIG. 1, a cooling apparatus 1 according to an embodiment is provided in an electric vehicle, and configured to cool, through a thermoelectric device 50 and/or air, the coolant for cooling a cooling target 10 provided in the electric vehicle.

The cooling target 10 means a target (i.e., object) to be cooled by the cooling apparatus 1 according to the present disclosure. The cooling target 10 may include an electrical component provided in the electric vehicle. The electrical component provided in the electric vehicle may include at least one of an electric power control apparatus, an inverter, a power conversion device such as an on-board charger (OBC), a drive motor, or autonomous driving controller.

In an embodiment, the cooling target 10 is not cooled by a heat pump system provided in the electric vehicle, but instead is cooled by the cooling apparatus 1, separately provided in the electric vehicle.

For example, the cooling target 10, such as the electrical component, is not cooled by the existing heat pump system but may be cooled through the separate cooling apparatus 1. Accordingly, the existing heat pump system may focus on cooling the battery module and the vehicle interior, thereby preventing the performance of the existing heat pump system from being deteriorated. Thus, the cooling target 10 such as the electrical component may be independently cooled.

Figure 2:
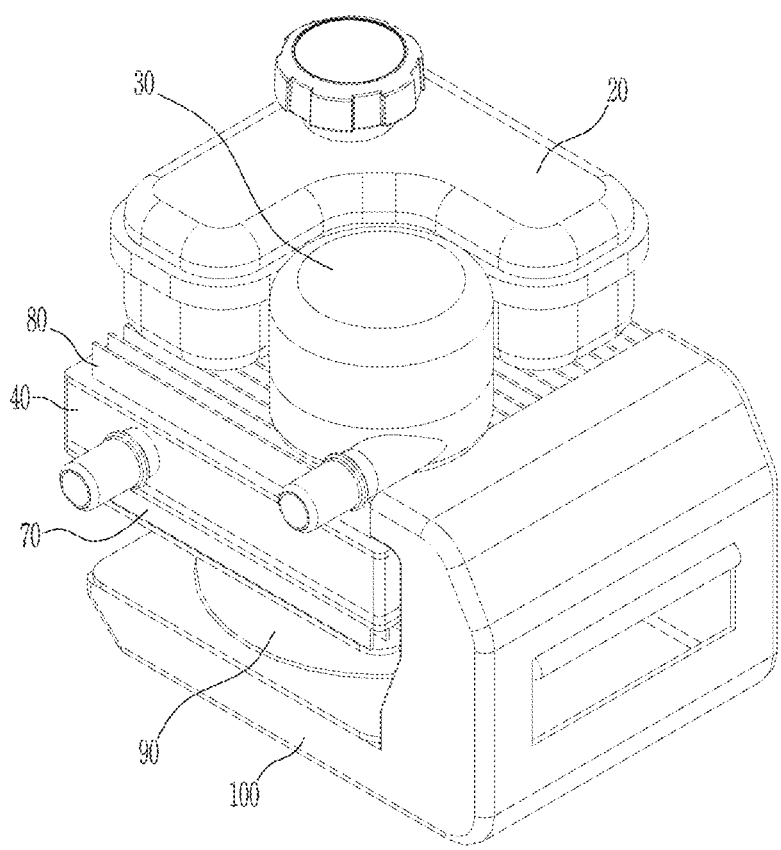
FIG. 2 is a perspective view showing a configuration of a cooling apparatus according to an embodiment.
Figure 3:
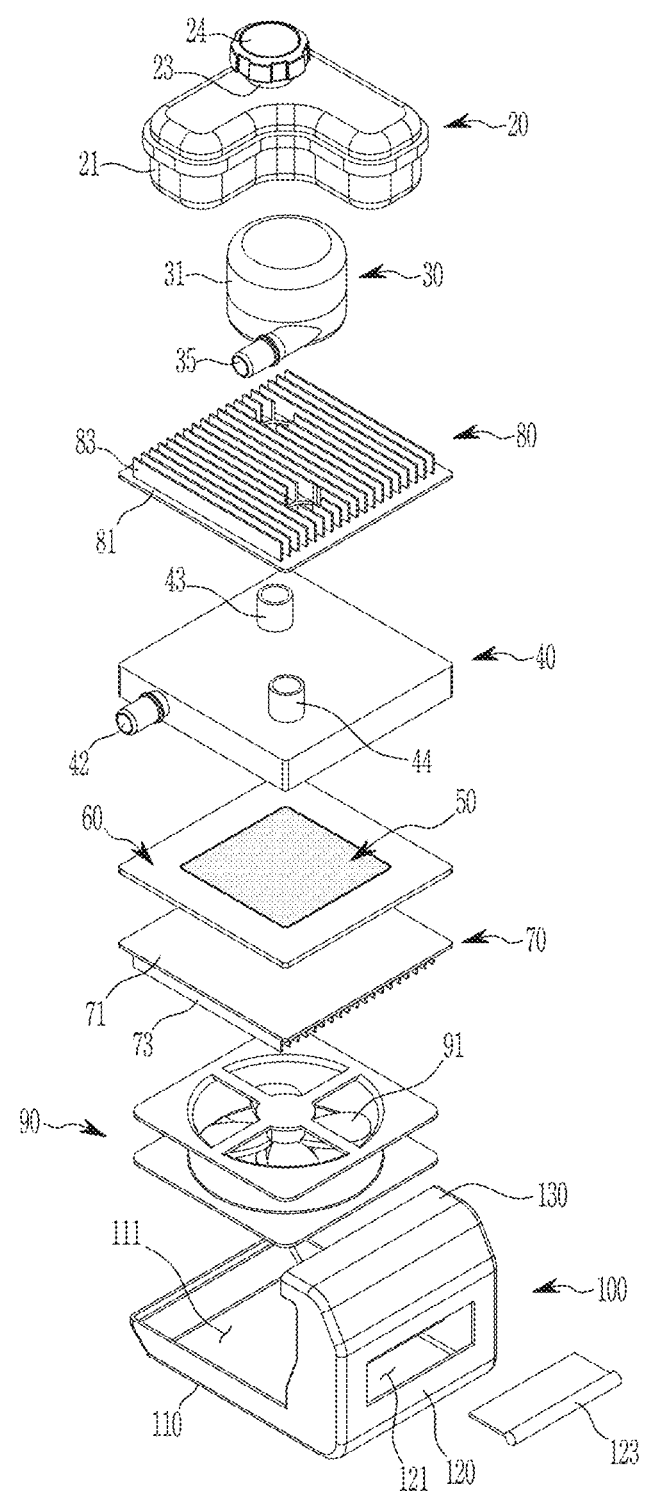
FIG. 3 is an exploded perspective view showing a configuration of a cooling apparatus according to an embodiment.
Figure 4:
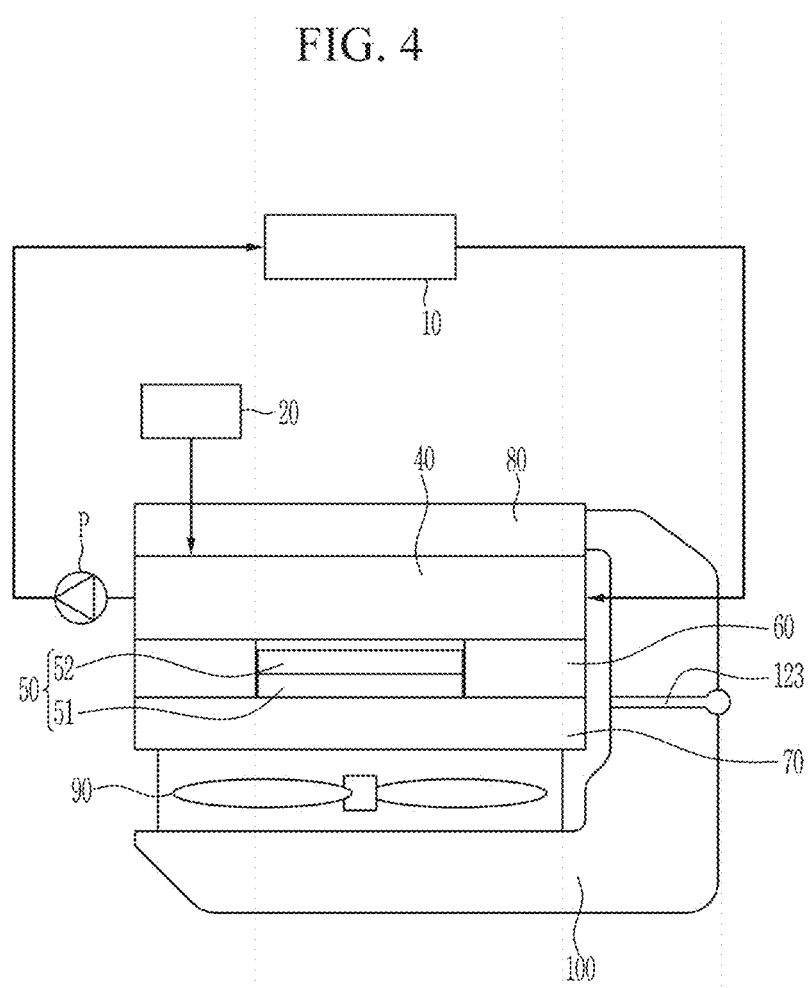
FIG. 4 is a schematic view showing a configuration of a cooling apparatus according to an embodiment.

FIG. 2 is a perspective view showing a configuration of a cooling apparatus according to an embodiment. FIG. 3 is an exploded perspective view showing a configuration of a cooling apparatus according to an embodiment. FIG. 4 is a schematic view showing a configuration of a cooling apparatus according to an embodiment.

As shown in FIGS. 2-4, the cooling apparatus 1 according to an embodiment may include a reservoir tank 20, an electric water pump 30, a coolant channel 40, the thermoelectric device 50, a first heat sink 70, a second heat sink 80, an air duct 100, and a cooling fan 90.

The reservoir tank 20 may temporarily store the coolant and may replenish coolant to the cooling system in response to a change in the volume of the coolant flowing through a cooling system including the coolant channel 40. For example, when the coolant is heated and its volume expands or increases, the coolant with the increased volume (e.g., the additional volume of coolant) is temporarily stored in the reservoir tank 20. Conversely, when the coolant is cooled and its volume is reduced, the coolant stored in the reservoir tank 20 is replenished or supplied to the cooling system.

Figure 5A:
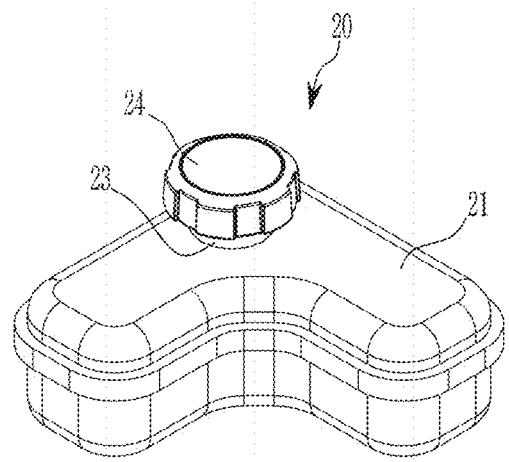
FIG. 5A and FIG. 5B are perspective views showing a configuration of a reservoir tank according to an embodiment.
Figure 5B:
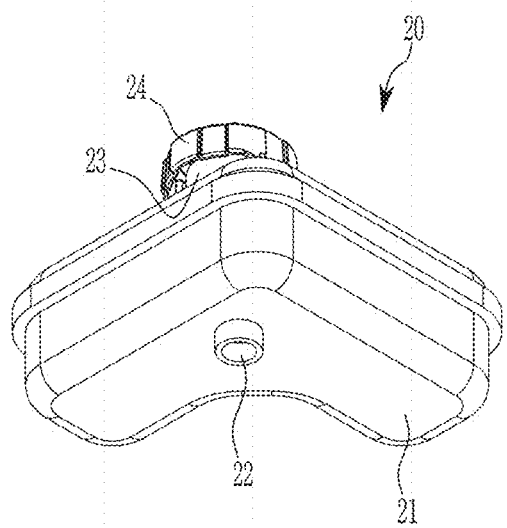

Referring to FIGS. 5A and 5B, the reservoir tank 20 may include a tank main body 21 configured to store the coolant, and a tank in/out port 22 provided in a lower portion of the tank main body 21 and configured to allow coolant to flow in and out of the tank main body. A tank inlet 23 to refill the coolant is formed in an upper portion of the reservoir tank 20, and a tank cap 24 capable of selectively opening/closing the tank inlet 23 may be provided at the tank inlet 23.

The electric water pump 30 pumps the coolant flowing through the cooling system including the coolant channel 40 and smoothens the flow of the coolant flowing through the cooling system. The coolant may be supplied from the coolant channel 40 to the cooling target 10 by an operation of the electric water pump 30.

Figure 6:
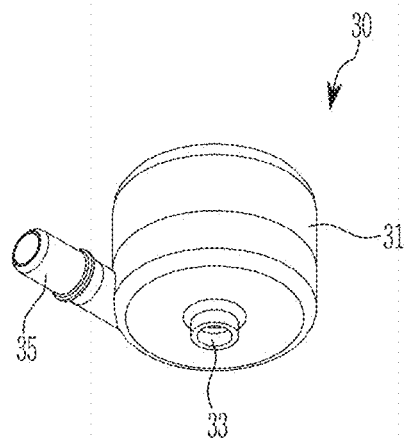
FIG. 6 is a perspective view showing a configuration of an electric water pump according to an embodiment.

Referring to FIG. 6, the electric water pump 30 may include a pump main body 31 in which an electric pump is installed, a pump inlet 33 formed in a lower portion of the pump main body 31, and a pump outlet 35 formed in a side surface of the pump main body 31.

The pump inlet 33 is fluidically connected to or in fluid communication with the coolant channel 40, and the coolant flow from the coolant channel 40 to the pump main body 31. In addition, the pump outlet 35 is fluidically connected to or in fluid communication with the cooling target 10. The coolant pumped by the electric pump installed in the pump main body 31 is discharged to the cooling target 10.

The coolant channel 40 may be fluidically connected to or in fluid communication with the cooling target 10, the reservoir tank 20, and the electric water pump 30.

Figure 7:
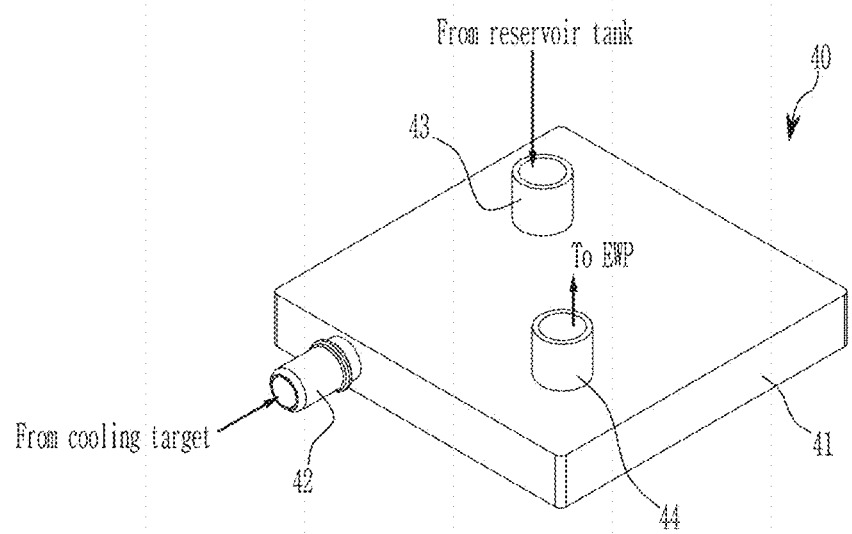
FIG. 7 is a perspective view showing a configuration of a coolant channel according to an embodiment.

Referring to FIG. 7, the coolant channel 40 may include a channel main body 41 configured to store the coolant, a first channel inlet 42 formed on the channel main body 41, a second channel inlet 43 formed on the channel main body 41, and a channel outlet 44 formed on the channel main body 41.

The high temperature coolant having cooled the cooling target 10 flows into the channel main body 41 through the first channel inlet 42. The high temperature coolant is cooled in the channel main body 41 by the thermoelectric device 50 and/or the second heat sink 80. The coolant stored in the channel main body 41 of the cooling channel is supplied to the electric water pump 30 through the channel outlet 44, and then to the cooling target 10 (e.g., via the electric water pump 30. If necessary, when the coolant is insufficient in the channel main body 41, the coolant may be replenished from the reservoir tank 20 to the channel main body 41 through the second channel inlet 43.

For such a purpose, the first channel inlet 42 is fluidically connected to or in fluid communication with the cooling target 10, the second channel inlet 43 is fluidically connected to or in fluid communication with the reservoir tank 20, and the channel outlet 44 is fluidically connected to or in fluid communication with the electric water pump 30.

The thermoelectric device 50 is an element that heats a first surface and cools a second surface by allowing heat to flow from the first surface to the second surface using supplied electric energy. The thermoelectric device 50 may include a higher-temperature part 51 heated by being supplied with electrical energy, and a lower-temperature part 52 cooled by being supplied with electrical energy.

Figure 8A:
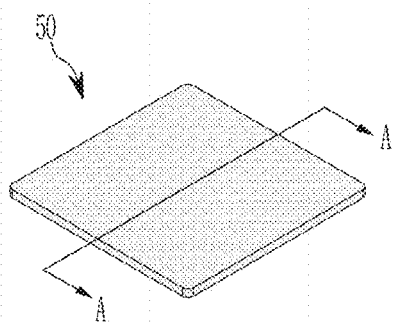
FIGS. 8A-8C are exploded perspective views showing a configuration of a thermoelectric device according to an embodiment.
Figure 8B:
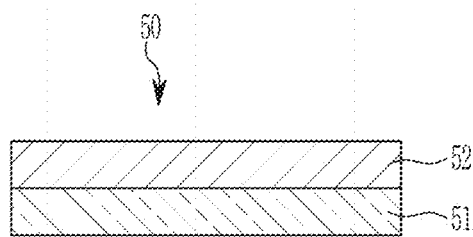
Figure 8C:
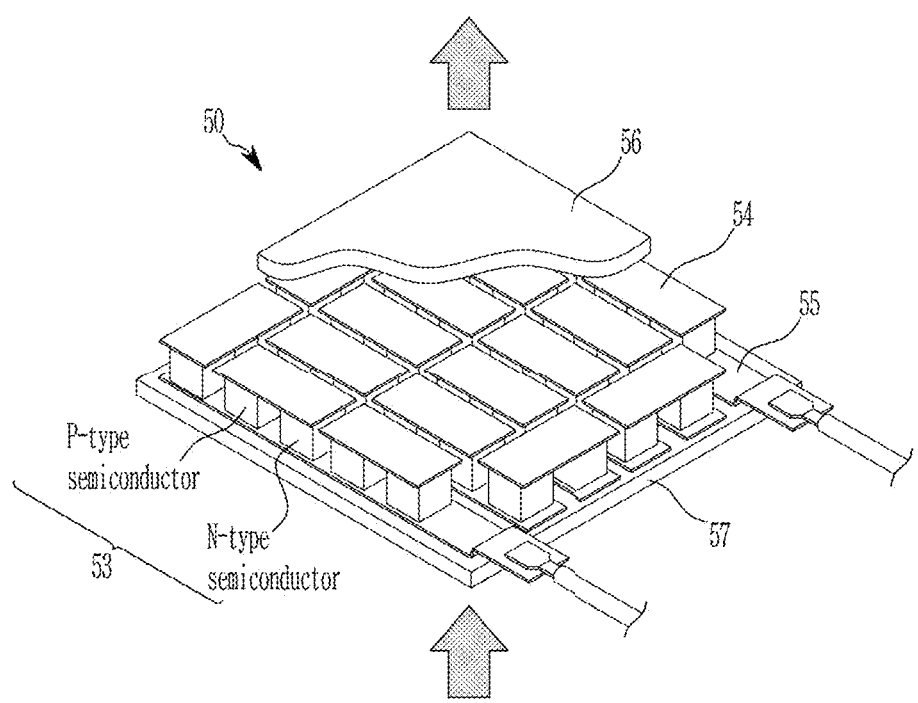

Referring to FIG. 8A-8C, the thermoelectric device 50 may include Peltier elements 53 that are combinations of P-type semiconductors and N-type semiconductors, an upper conductor 54 disposed above the Peltier element 53, a lower conductor 55 disposed below the Peltier element 53, an upper insulator 56 disposed above the upper conductor 54, and a lower insulator 57 disposed below the lower conductor 55.

The upper conductor 54 and the lower conductor 55 are a practical cooling engine and may be made of copper. The upper insulator 56 and the lower insulator 57 may be made of ceramic to transfer heat and limit electrical flow. When electrical energy is supplied to the Peltier element 53, the upper conductor 54 is heated and the lower conductor 55 is cooled according to the movement of charges occurring between the P-type semiconductor and the N-type semiconductor.

In one embodiment, the upper conductor 54 may be implemented as a lower-temperature part 52 and the lower conductor 55 may be implemented as a higher-temperature part 51.

The thermoelectric device 50 is disposed adjacent to a lower portion of the coolant channel 40. Specifically, the lower-temperature part 52 of the thermoelectric device 50 is disposed adjacent to the lower portion of the coolant channel 40. When the higher-temperature part 51 is heated and the lower-temperature part 52 is cooled due to the supply of electrical energy, the coolant stored in the coolant channel 40 may be cooled by the cold air of the lower-temperature part 52.

The cooling apparatus 1 according to an embodiment may further include a thermal insulation pad 60 provided on a side surface of the thermoelectric device 50.

Figure 9:
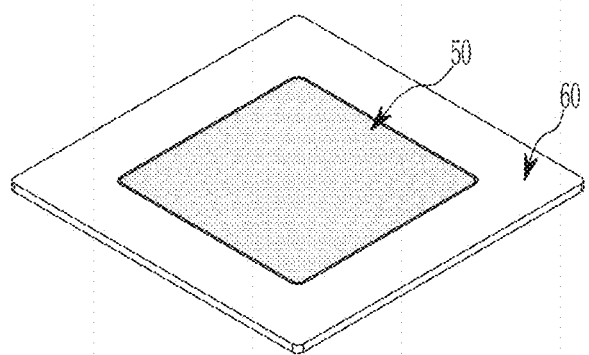
FIG. 9 is a perspective view showing a configuration of a thermoelectric device and a thermal insulation pad according to an embodiment.

Referring to FIG. 9, the thermal insulation pad 60 is provided to surround the side surface of the thermoelectric device 50, and blocks heat generated from the side surface of the thermoelectric device 50 from being emitted to the outside or an exterior (e.g., of the cooling apparatus 1).

The first heat sink 70 is disposed adjacent to a lower portion of the higher-temperature part 51 of the thermoelectric device 50, and may cool the heat generated by the higher-temperature part 51 of the thermoelectric device 50.

Figure 10:
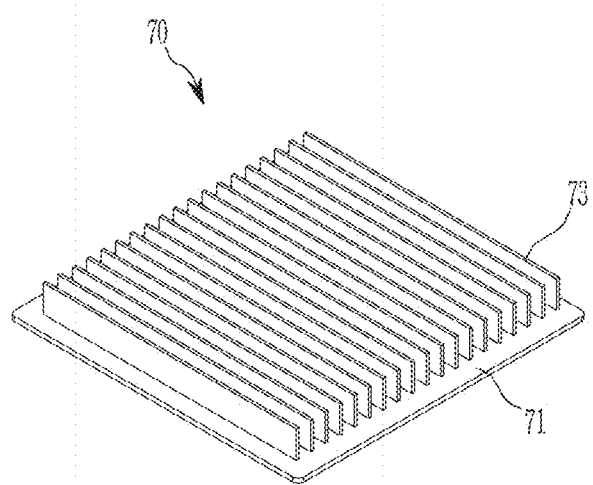
FIG. 10 is a perspective view showing a configuration of a first heat sink according to an embodiment.

Referring to FIG. 10, the first heat sink 70 may include a first sink body 71, and a plurality of first cooling fins 73 formed on the first sink body 71.

The first sink body 71 is formed as a generally plate shape and may be disposed adjacent to the higher-temperature part 51 on a lower portion of the thermoelectric device 50. The plurality of first cooling fins 73 formed on the first sink body 71 increases a contact area on which the air contacts the first heat sink 70. Accordingly, heat generated at the higher-temperature part 51 of the thermoelectric device 50, may be more effectively dissipated to cool the higher-temperature part 51 of the thermoelectric device 50 by air-cooling.

The second heat sink 80 is disposed adjacent to an upper portion of the coolant channel 40 and may cool the coolant stored in the coolant channel 40 by air-cooling.

Figure 11:
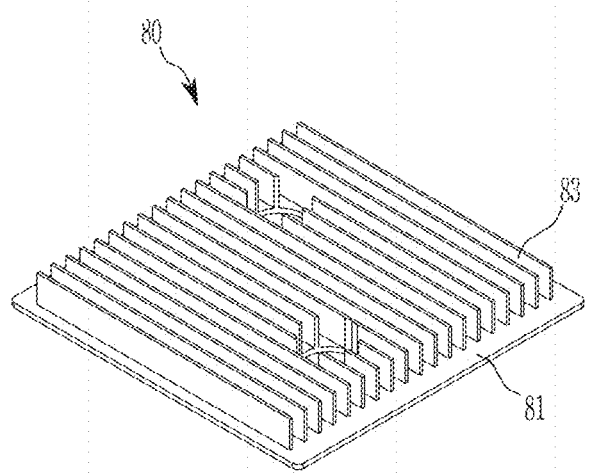
FIG. 11 is a perspective view showing a configuration of a second heat sink according to an embodiment.

Referring to FIG. 11, the second heat sink 80 may include a second sink body 81, and the plurality of first cooling fins 73 formed on the second sink body 81.

The second sink body 81 is formed as a generally plate shape and may be disposed adjacent to the upper portion of the coolant channel 40. A plurality of second cooling fins 83 formed on the second sink body 81 increases a contact area on which the air contacts the second heat sink 80. Accordingly, heat discharged from the coolant stored in the coolant channel 40, may be more effectively dissipated to cool the coolant stored in the coolant channel 40 by air-cooling.

The cooling fan 90 is disposed adjacent to a lower portion of the first heat sink 70 and may cool the first heat sink 70.

Figure 12:
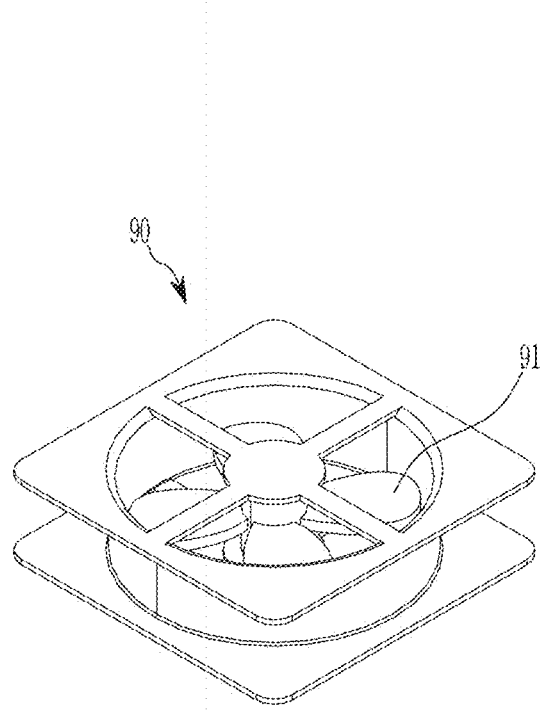
FIG. 12 is a perspective view showing a configuration of a cooling fan according to an embodiment.
Figure 13A:
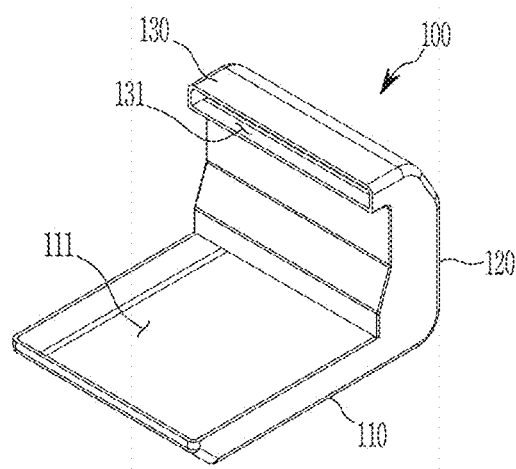
FIGS. 13A-13D are drawings showing a configuration of an air duct according to an embodiment.
Figure 13B:
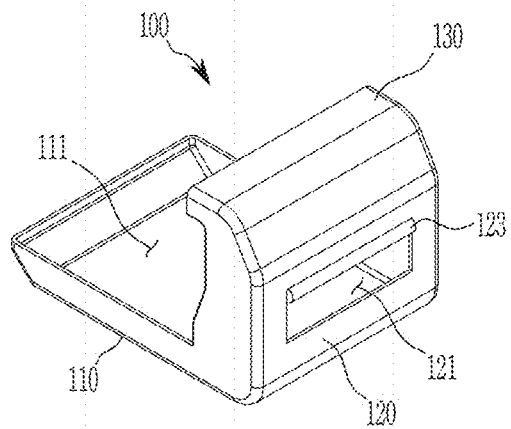
Figure 13C:
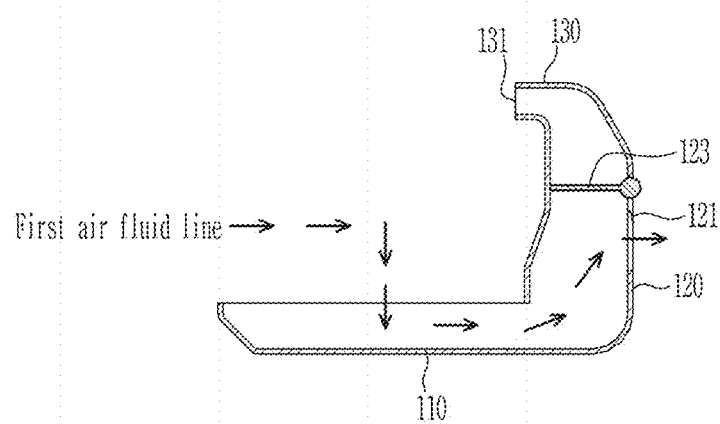
Figure 13D:
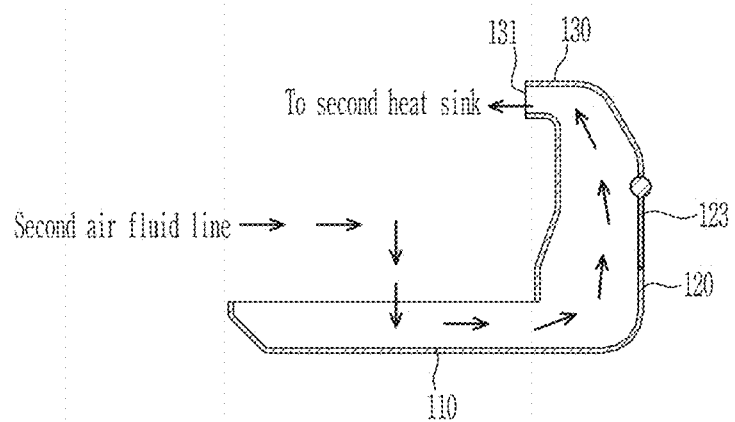

Referring to FIG. 12, the cooling fan 90 may include a fan blade 91 rotated by electrical energy. When the fan blade 91 rotates due to the supply of electrical energy, air flow to the plurality of first cooling fins 73 of the first heat sink 70 may be increased to rapidly cool the first heat sink 70 by air-cooling.

The air duct 100 is formed in a generally U-shape and may be configured to circulate air to the first heat sink 70 and/or the second heat sink 80 by an operation of the cooling fan 90.

Referring to FIGS. 13A-13D, the air duct 100 may include a duct lower body 110 having an open top, a duct side body 120 extending upward from the duct lower body 10 and having a hollow interior, and a duct upper body 130 extend from the duct side body 120 in a direction in which the duct lower body 110 extends and having a hollow interior.

A side surface air outlet 121 is formed on the duct side body 120, and an air door 123 is rotatably provided on the side surface air outlet 121. The air door 123 may be provided to be rotated by an electric motor (not shown).

An end portion of the duct upper body 130 is open to form an upper air outlet 131, and the upper air outlet 131 is formed to face the second heat sink 80.

When the air door 123 is rotated in a first direction (e.g., clockwise in FIG. 13C), the side surface air outlet 121 is opened and an interior space of the duct side body 120 is blocked. To the contrary, when the air door 123 is rotated in a second direction (e.g., anticlockwise in FIG. 13D), the side surface air outlet 121 is blocked and the interior space of the duct side body 120 is opened.

In addition, the cooling fan 90 is disposed in the open top of the duct lower body 110.

The duct lower body 110, the duct side body 120 and the duct upper body 130 cooperatively form a first air fluid line through which the air passes through only the first heat sink 70, and a second air fluid line through which the air passes through the first heat sink 70 and the second heat sink 80. At this time, according to opening and closing of the air door 123 provided in the duct side body 120 (alternatively, according to a rotation of the air door 123), the first air fluid line or the second air fluid line is formed in the air duct 100.

At this time, the first air fluid line is a path in which the air flows through an opening 111 of the duct lower body 110, an interior space of the duct lower body 110, the interior space of the duct side body 120, and the side surface air outlet 121 formed on the duct side body 120. In addition, the second air fluid line is a path in which the air flows through the opening 111 of the duct lower body 110, the interior space of the duct lower body 110, the interior space of the duct side body 120, an interior space of the duct upper body 130, and the opening 131 of the duct upper body 130.

For example, when the air door 123 opens the side surface air outlet 121 and blocks the interior space of the duct side body 120, and the cooling fan 90 is operated, the air having passed through the first heat sink 70 by the operation of the cooling fan 90 passes through the first air fluid line, and then is discharged through the side surface air outlet 121. In addition, when the air door 123 blocks the side surface air outlet 121 and opens the interior space of the duct side body 120, and the cooling fan 90 is operated, the air having passed through the first heat sink 70 by the operation of the cooling fan 90 passes through the second air fluid line, passes through the second heat sink 80, and then is discharged.

In the cooling apparatus 1 according to an embodiment, the cooling fan 90, the first heat sink 70, the thermoelectric device 50, the coolant channel 40, the second heat sink 80 may be sequentially disposed in a vertical direction, and may be modularized.

Hereinafter, the operation of the cooling apparatus is described in detail with reference to the accompanying drawings.

Figure 14A:
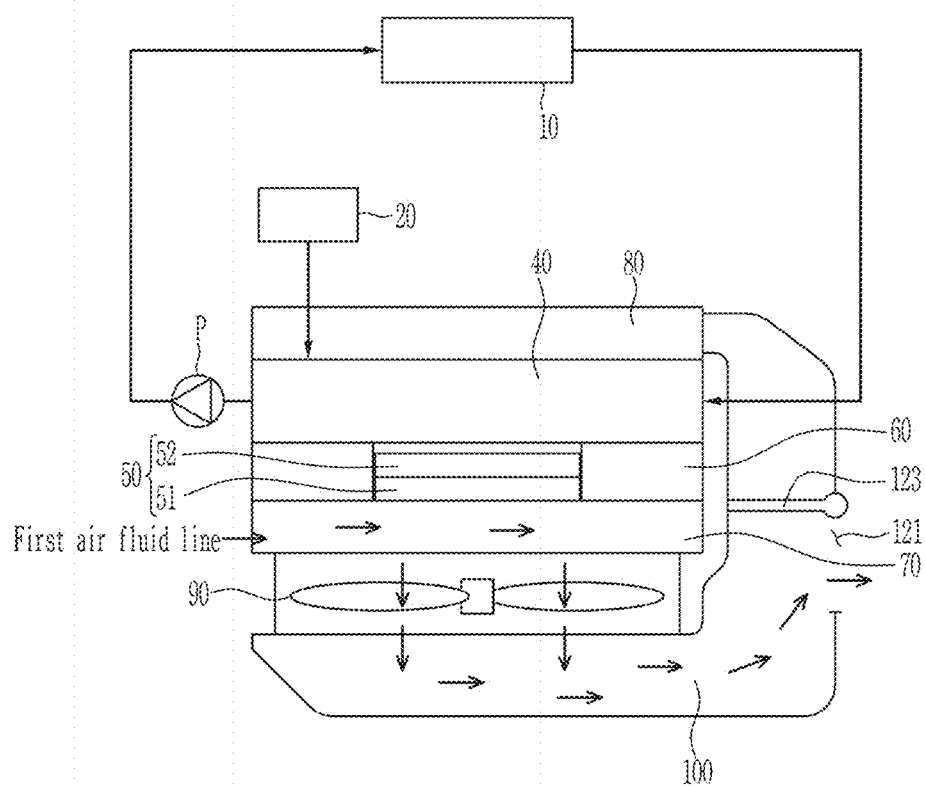
FIG. 14A and FIG. 14B are drawings for explaining an operation of a cooling apparatus according to an embodiment.
Figure 14B:
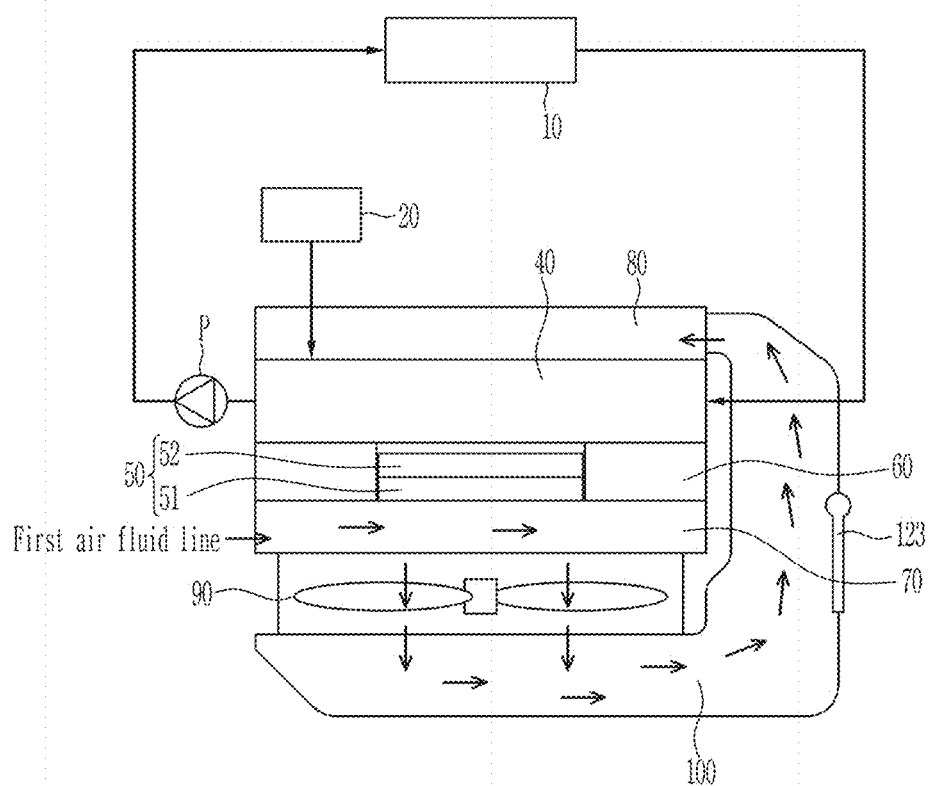

FIGS. 14A and 14B are drawings for explaining an operation of a cooling apparatus according to an embodiment.

According to an embodiment, the cooling apparatus 1 may operate in a first mode or a second mode depending on a temperature of the cooling target 10.

The first mode is a mode for cooling the cooling target 10 in which, when the temperature of the cooling target 10 is a predetermined temperature or above, the coolant stored in the coolant channel 40 is cooled through the thermoelectric device 50, and simultaneously, the coolant stored in the coolant channel 40 is cooled through the air circulation by the air duct 100. In addition, the second mode is a mode for cooling the cooling target 10 in which, when the temperature of the cooling target 10 is below the predetermined temperature, the coolant stored in the coolant channel 40 is not cooled through the thermoelectric device 50 and is cooled only through the air circulation by the air duct 100.

The first mode is a kind of fast cooling mode that cools the cooling target 10 more rapidly than the second mode. The second mode cools the cooling target 10 by the lower-temperature part 52 of the thermoelectric device 50 and the air circulation by the air duct 100. In addition, the second mode is a normal cooling mode that cools the cooling target 10 relatively slowly compared to the first mode and cools the cooling target 10 by only the air circulation by the air duct 100.

Referring to FIG. 14A, in the first mode, the thermoelectric device 50 is turned-on, such that electrical energy is supplied to the thermoelectric device 50, such that the higher-temperature part 51 of the thermoelectric device 50 is heated and the lower-temperature part 52 is cooled. Accordingly, the coolant stored in the coolant channel 40 disposed adjacent to the lower-temperature part 52 is cooled by the lower-temperature part 52. At the same time, the air door 123 of the air duct 100 rotates in the first direction, and the side surface air outlet 121 is opened and the interior space of the duct side body 120 is blocked. In addition, the cooling fan 90 operates. Therefore, the air having passed through the first heat sink 70 by the operation of the cooling fan 90 passes through the first air fluid line of the air duct 100, and then is discharged through the side surface air outlet 121. Accordingly, the first heat sink 70 is cooled by the air passing through the first air fluid line, and the coolant stored in the coolant channel 40 is cooled by the first heat sink 70 cooled by the air.

Referring to FIG. 14B, in the second mode, since the thermoelectric device 50 is turn-off and electrical energy is not supplied to the thermoelectric device 50, the higher-temperature part 51 of the thermoelectric device 50 is not heated and the lower-temperature part 52 is not cooled. Accordingly, the coolant stored in the coolant channel 40 is not cooled by the thermoelectric device 50. At the same time, the air door 123 of the air duct 100 rotates in the second direction, and the side surface air outlet 121 is blocked and the interior space of the duct side body 120 is opened. In addition, the cooling fan 90 operates. Therefore, the air having passed through the first heat sink 70 by the operation of the cooling fan 90 passes through the second air fluid line of the air duct 100, passes through the second heat sink 80, and then is discharged. Accordingly, the first heat sink 70 and the second heat sink 80 is cooled by the air passing through the second air fluid line, and the coolant stored in the coolant channel 40 is cooled by the second heat sink 80 cooled by the air.

According to an embodiment described above, the cooling target 10 such as an autonomous driving controller is cooled through the separate cooling apparatus 1, and the load applied to the existing heat pump system may be reduced.

In addition, by independently cooling the cooling target 10 such as an autonomous driving controller, cooling performance of the existing heat pump system for vehicle interior cooling or battery module may be prevented from being deteriorated.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

<Description of symbols>

| | |
|---|---|
| 1: cooling apparatus | 10: cooling target |
| 20: reservoir tank | 21: tank main body |
| 22: tank in/out port | 23: tank inlet |
| 24: tank cap | 30: electric water pump |
| 31: pump main body | 33: pump inlet |
| 35: pump outlet | 40: coolant channel |
| 41: channel main body | 42: first channel inlet |
| 43: second channel inlet | 44: channel outlet |
| 50: thermoelectric device | 51: higher-temperature part |
| 52: lower-temperature part | 53: Peltier element |
| 54: upper conductor | 55: lower conductor |
| 56: upper insulator | 57: lower insulator |
| 60: thermal insulation pad | 70: first heat sink |
| 71: first sink body | 73: first cooling fin |
| 80: second heat sink | 81: second sink body |
| 83: second cooling fin | 90: cooling fan |
| 91: fan blade | 100: air duct |
| 110: duct lower body | 111: opening |
| 120: duct side body | 121: side surface air outlet |
| 123: air door | 130: duct upper body |
| 131: upper air outlet | |

What is claimed is:

1. A cooling apparatus, comprising:
   an electric water pump configured to pump coolant;
   a coolant channel in fluid communication with a cooling target and the electric water pump;
   a thermoelectric device including a higher-temperature part heated by being supplied with electrical energy and a lower-temperature part cooled by being supplied with electrical energy, the thermoelectric device configured to cool the coolant flowing into the coolant channel by the lower-temperature part;
   a first heat sink disposed adjacent to the higher-temperature part of the thermoelectric device;
   a second heat sink disposed adjacent to the coolant channel;
   a cooling fan provided adjacent to the first heat sink;
   an air duct forming a first fluid line where air passes through only the first heat sink and then is discharged by an operation of the cooling fan, and a second fluid line where air passes through the first heat sink and the second heat sink and then is discharged by the operation of the cooling fan, the air duct including a duct lower body disposed below the cooling fan and having a hollow interior, a duct side body extending upward from the duct lower body and having a hollow interior, and a duct upper body extending from a side surface of the duct side body and having a hollow interior;

an air door provided on a side surface air outlet formed on the duct side body; and an upper air outlet formed on an end portion of the duct upper body.

2. The cooling apparatus of claim 1, further comprising a reservoir tank configured to temporarily store some of the coolant and to replenish the coolant channel with the stored coolant.

3. The cooling apparatus of claim 1, further comprising a thermal insulation pad provided to surround a side surface of the thermoelectric device.

4. The cooling apparatus of claim 1, wherein the cooling fan, the first heat sink, the coolant channel, and the second heat sink are sequentially disposed along a predetermined direction.

5. The cooling apparatus of claim 1, wherein the upper air outlet is formed to face the second heat sink.

6. The cooling apparatus of claim 1, wherein the first air fluid line and the second air fluid line are formed according to an operation of the air door.

7. A vehicle comprising the cooling apparatus of claim 1.

8. The cooling apparatus of claim 6, wherein the first air fluid line comprises an opening of the duct lower body, an interior space of the duct lower body, an interior space of the duct side body, and the side surface air outlet formed on the duct side body.

9. The cooling apparatus of claim 6, wherein the second air fluid line comprises an opening of the duct lower body, an interior space of the duct lower body, an interior space of the duct side body, an interior space of the duct upper body, and the opening of the duct upper body.

10. The cooling apparatus of claim 6, wherein:

when the air door rotates in a first direction, the side surface air outlet is opened and an interior space of the duct side body is blocked, such that the first air fluid line is formed; and when the air door rotates in a second direction, the side surface air outlet is blocked and the interior space of the duct side body is opened, such that the second air fluid line is formed.

11. The cooling apparatus of claim 6, wherein, according to a temperature of the cooling target, the cooling apparatus is configured to:

operate in a first mode in which the coolant of the coolant channel is cooled by the lower-temperature part of the thermoelectric device and by air circulation via the air duct; and operate in a second mode in which the coolant of the coolant channel is cooled only by the air circulation by the air duct.

12. The cooling apparatus of claim 11, wherein the cooling apparatus is configured to:

operate in the first mode when the temperature of the cooling target is a predetermined temperature or above; and operate in the second mode when the temperature of the cooling target is below the predetermined temperature.

13. The cooling apparatus of claim 11, wherein, in the first mode:

the thermoelectric device is turned on such that the lower-temperature part of the thermoelectric device cools the coolant of the coolant channel; and the coolant stored in the coolant channel is cooled by cooling the first heat sink by air passing through the first air fluid line of the air duct by the operation of the cooling fan.

14. The cooling apparatus of claim 11, wherein, in the second mode:

the thermoelectric device is turned off; and the coolant stored in the coolant channel is cooled by cooling the second heat sink by air passing through the second air fluid line of the air duct by the operation of the cooling fan.

* * * * *